United States Patent
Kang et al.

(10) Patent No.: US 7,056,002 B2
(45) Date of Patent: Jun. 6, 2006

(54) BACKLIGHT ASSEMBLY FOR A DISPLAY DEVICE

(75) Inventors: Sang-Min Kang, Siheung-si (KR);
Jeong-Hwan Lee, Suwon-si (KR);
Jong-Dae Park, Seoul (KR);
Seok-Won Lee, Yongin-si (KR);
Kyung-Rok Ko, Suwon-si (KR)

(73) Assignee: Samsung Electronics Co., LTD, Gyeonggi-do (KR)

( * ) Notice: Subject to any disclaimer, the term of this patent is extended or adjusted under 35 U.S.C. 154(b) by 0 days.

(21) Appl. No.: 10/887,349

(22) Filed: Jul. 7, 2004

(65) Prior Publication Data

US 2005/0099790 A1    May 12, 2005

(30) Foreign Application Priority Data

Jul. 7, 2003    (KR) ...................... 10-2003-0045775

(51) Int. Cl.
*G02F 1/1335*    (2006.01)
(52) U.S. Cl. ........................ 362/561; 362/623; 362/634
(58) Field of Classification Search ................. 362/26, 362/31, 29, 561, 623, 625, 628, 632, 633, 362/634; 349/58, 65
See application file for complete search history.

(56) References Cited

U.S. PATENT DOCUMENTS

| | | | |
|---|---|---|---|
| 6,522,371 B1 * | 2/2003 | Sakamoto et al. ............ 349/58 |
| 6,854,856 B1 * | 2/2005 | Shin et al. ..................... 362/31 |
| 2002/0034072 A1 * | 3/2002 | Iwatsuki ...................... 362/31 |
| 2002/0044437 A1 * | 4/2002 | Lee .............................. 362/31 |
| 2002/0149712 A1 * | 10/2002 | Kitamura et al. ............. 349/58 |
| 2003/0063456 A1 * | 4/2003 | Katahira ..................... 362/561 |

* cited by examiner

*Primary Examiner*—Y. My Quach-Lee
(74) *Attorney, Agent, or Firm*—DLA Piper Rudnick Gray Cary US LLP

(57) ABSTRACT

A method of forming a backlight assembly is presented. The invention reduces the degradation of display quality caused by an uneven expansion of the reflective sheet in a display device. The reflective sheet may be positioned between the light guiding plate and the base in a backlight assembly of a display device. The backlight assembly includes a light source, a light guiding plate positioned to guide light from the light source in a predetermined direction, a base on which the light guiding plate is mounted, and a reflective sheet positioned between the light guiding plate and the base. The reflective sheet has a cutout. A supporting structure extends through the cutout between the light guiding plate and the base to support the light guiding plate. A liquid crystal display device made with such backlight assembly is also presented.

23 Claims, 8 Drawing Sheets

BACKLIGHT ASSEMBLY FOR A DISPLAY DEVICE

RELATED APPLICATION

This application claims priority, under 35 USC § 119, from Korean Patent Application No. 2003-45775 filed on Jul. 7, 2003, the contents of which are incorporated by reference herein.

BACKGROUND OF THE INVENTION

1. Field of the Invention

The present invention relates generally to a light assembly, and more particularly to a backlight assembly for a liquid crystal display device.

2. Description of the Related Art

A liquid crystal display (LCD) is a passive device that does not emit light. A liquid crystal display (LCD) device displays images by reflecting natural light that is incident on a liquid crystal (LC) panel of the LCD device and/or by using a backlight assembly that is incorporated into the LCD device.

The backlight assembly is generally classified into an edge-type and a direct-type, according to the position of the light source. In the edge-type backlight assembly, the light source is positioned near the edges of the LC panel. Thus, the edge-type backlight assembly needs a light guiding plate to guide the light to the LC panel disposed over the light guiding plate. In contrast, the direct-type backlight assembly does not need a light guiding plate because the light source is disposed under the LC panel and the light from the light source is directly incident on the LC panel. The edge-type backlight assembly is further classified into a flat-type and wedge-type according to the shape of the light guiding plate.

FIG. 1A is a cross sectional view of a conventional flat-type backlight assembly, and FIG. 1B is a cross sectional view of the conventional wedge-type backlight assembly.

As shown in FIG. 1A, a first and second lamp reflectors 12a and 12b are disposed near two opposing edges of the flat-type light guiding plate 10 for preventing light leakage. A first and second lamp units 14a and 14b are disposed on an inner surface of the first and second reflectors 12a and 12b, respectively. The light guiding plate 10 directs the light generated from the first and second lamp units 14a and 14b toward optical sheets 16. A reflective sheet 18 is disposed on a surface of the light guiding plate 10 that is opposite the surface that is closest to the optical sheets 16. The reflective sheet 18 reduces light leakage by reflecting any leaked light back toward the optical sheets 16. "Light leakage," as used herein, is light traveling in directions that are not conducive to enhancing the luminance of the display device, e.g. away from the direction of the LC panel.

As shown in FIG. 1B, in the wedge-type backlight assembly, a lamp reflector 22 is disposed near one end of a light guiding plate 20 to prevent light leakage. A lamp unit 24 is disposed on an inner surface of the lamp reflector 22. The light guiding plate 20 guides the light from the lamp unit 24 to optical sheets 26. A reflective sheet 28 is disposed on a surface of the light guiding plate 20 that is opposite the surface on which the optical sheets 26 are disposed. The reflective sheet 28 reduces light leakage by reflecting light toward the optical sheets 26.

A problem with these backlight assemblies is that the reflective sheet expands with temperature. The degree of expansion varies as a function of distance from the lamp, and when different parts of the reflective sheet expand by different amounts, the reflective sheet loses its flatness. As shown in FIG. 1A and 1B, the light guiding plate 10/20 presses down on the reflective sheet 18/28 and is positioned to receive light that is reflected by the reflective sheet 18/28. When the reflective sheet loses its flatness, however, not all the light is reflected in the intended direction. Thus, the uneven expansion of the reflective sheet 18/28 results in degradation of display quality.

A method is needed to reduce the negative effects caused by an uneven expansion of the reflective sheet, thereby preventing degradation of display quality with increased temperature.

SUMMARY OF THE INVENTION

The invention provides a backlight assembly with reduced display quality degradation caused by uneven expansion of the reflective sheet, and a method of making such backlight assembly.

In one aspect, the backlight assembly of the invention includes a light source, a light guiding plate positioned to guide light from the light source in a predetermined direction, a base on which the light guiding plate is mounted, a reflective sheet positioned between the light guiding plate and the base, the reflective sheet having a cutout therein, and a supporting structure extending through the cutout and between the light guiding plate and the base for supporting the light guiding plate.

The invention also includes a liquid crystal display device including the above backlight assembly. The liquid crystal display device includes a display assembly including a liquid crystal panel, the backlight assembly described above, and a chassis enclosing the display assembly and the backlight assembly.

Further, the invention is a method of forming a backlight assembly. The method includes providing a light source, positioning a light guiding plate to direct light from the light source in a predetermined direction, mounting the light guiding plate on the base, and positioning a reflective sheet between the light guiding plate and the base. The reflective sheet has a cutout therein through which the supporting structure is extended. The supporting structure separates the reflective sheet and the light guiding plate by a predetermined distance.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Embodiments of the invention are described herein in the context of a flat-type LCD device. However, it is to be understood that the embodiments provided herein are just preferred embodiments, and the scope of the invention is not limited to the applications or the embodiments disclosed herein.

Figure 1A:
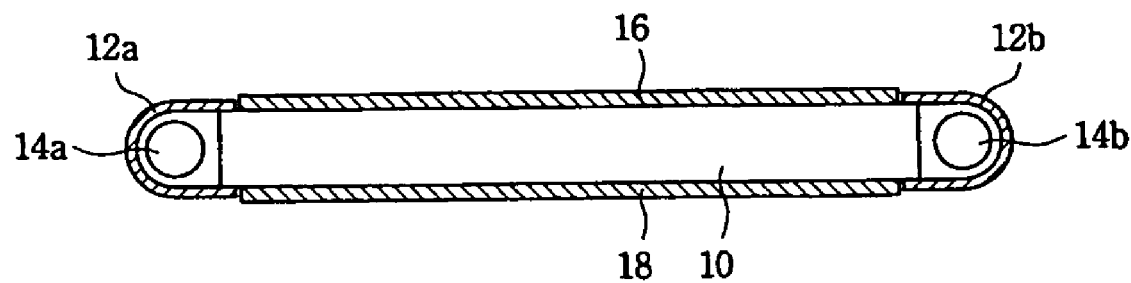
FIG. 1A is a cross sectional view of the conventional flat-type backlight assembly.
Figure 1B:
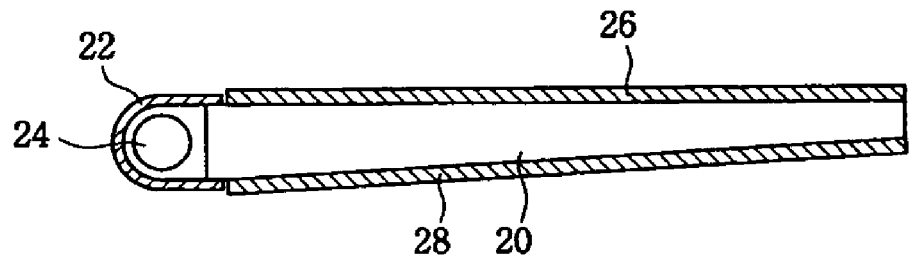
FIG. 1B is a cross sectional view of the conventional wedge-type backlight assembly.
Figure 2:
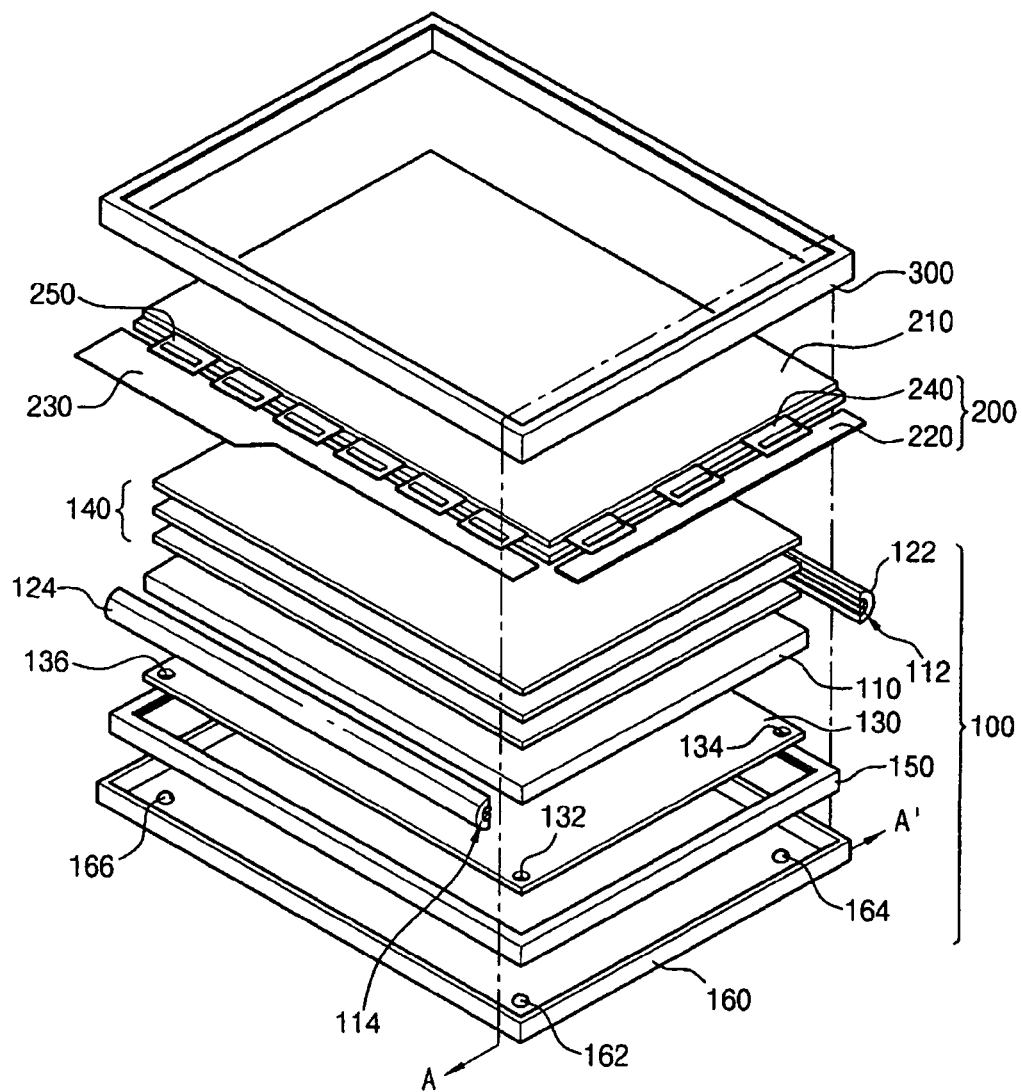
FIG. 2 is a top exploded perspective view of an LCD device according to a first embodiment of the present invention.
Figure 3:
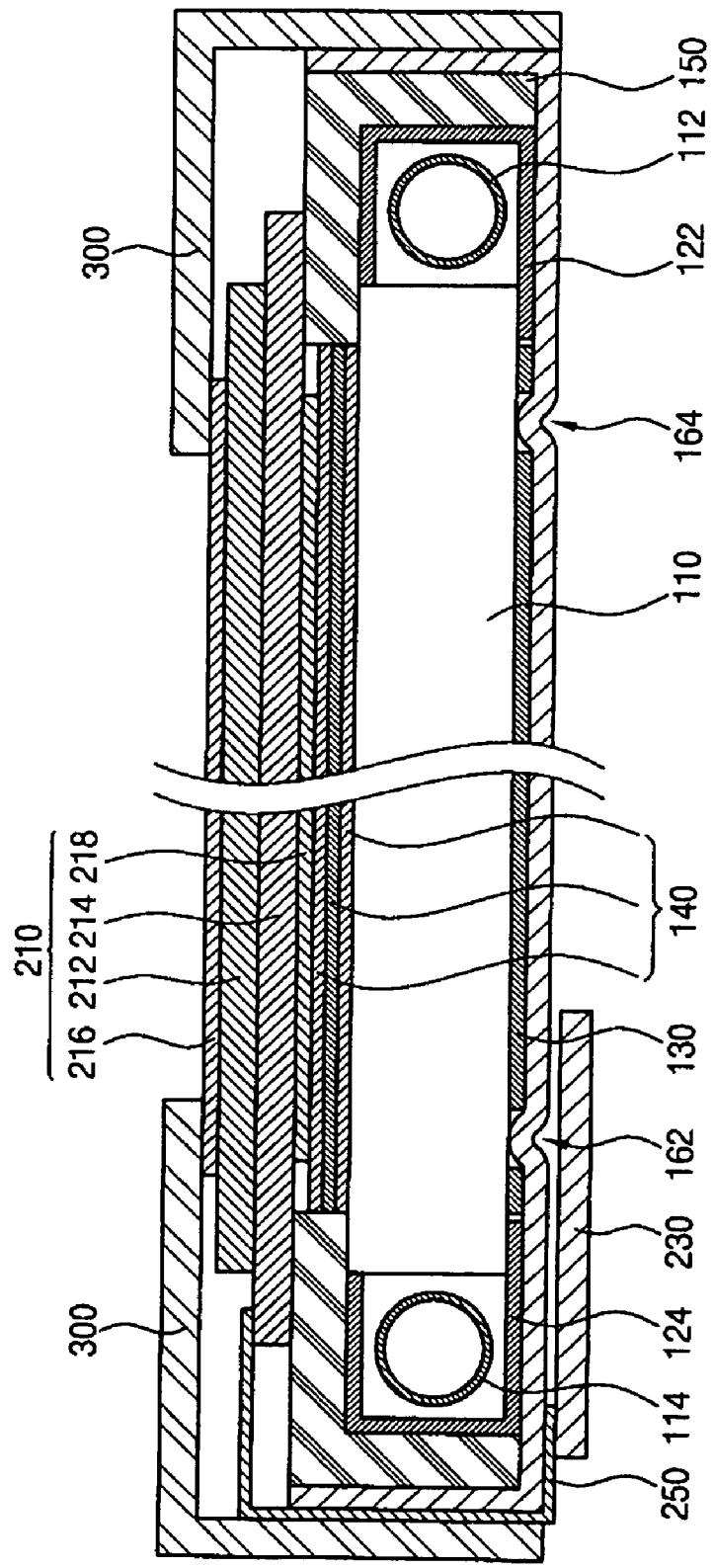
FIG. 3 is a cross sectional view taken along the line A–A' of FIG. 2.

FIG. 2 is an exploded perspective view illustrating an LCD device according to a first embodiment of the present invention, and FIG. 3 is a cross sectional view taken along the line A–A' of FIG. 2. The LCD device according to the first embodiment of the invention includes a backlight assembly having an I-shaped lamp and a reflective sheet.

Referring to FIGS. 2 and 3, the LCD device of the first embodiment includes a backlight assembly 100, a display assembly 200 and a first chassis 300.

The backlight assembly 100 includes a light guiding plate 110, first and second lamps 112 and 114, first and second lamp reflectors 122 and 124, a reflective sheet 130, a plurality of optical sheets 140, a mold frame 150, and a second chassis 160. The backlight assembly 100 supplies light to the display assembly 200. As shown in FIG. 3, the first chassis 300 and the second chassis 160 are designed to fit together and hold the components of the display assembly 200 and the backlight assembly 100.

The light guiding plate 110 redirects the light coming from the first and second lamps 112 and 114. More specifically, although the first and second lamps 112, 114 are linear light sources, they effectively act as a surface light source when combined with the light guiding plate 110. The light irradiates to the optical sheets 140 from the light guiding plate 110.

The first and second lamps 112 and 114 are disposed along two opposing sides of the light guiding plate 110, and irradiate light to the light guiding plate 110. A first and second lamp reflectors 122 and 124 are secured to the edges of the light guiding plate 110 to prevent leakage of the light emitted by the first and second lamps 112 and 114 in undesirable directions. Although the exemplary embodiment of FIG. 2 and FIG. 3 refers to a flat-type light guiding plate, the light guiding plate may be of any well-known shape and configuration, including but not limited to the wedge-type light guiding plate.

The reflective sheet 130 includes cutouts 134 formed near the corners of the rectangular plate. As illustrated in FIG. 3, the reflective sheet 130 is disposed under the light guiding plate 110 and reflects any light that leaks from the light guiding plate 110 toward the display assembly 200.

The optical sheets 140 include a plurality of functional sheets such as diffusing sheets and/or prism sheets. The optical sheets 140 improve uniformity of the light from the light guiding plate 110. The optical sheets 140 also concentrate the uniform light to further improve the luminance and the display quality of the device.

The reflective sheet 130, the light guiding plate 110, the first and second lamps 112 and 114, the first and second lamp reflectors 122 and 124 and the optical sheets 140 are sequentially placed in the second chassis 160 (see FIG. 3). The mold frame 150 is also received in the second chassis and holds the reflective sheet 130, the light guiding plate 110, the first and second lamps 112 and 114, the first and second lamp reflectors 122 and 124, and the optical sheets 140 against the second chassis. The mold frame 150 also supports the display assembly 200 mounted on the second chassis 160.

The second chassis 160 for supporting the light guiding plate 110 includes a base having supporting structures 164. The supporting structure 164 may be formed as an integral part of the base or attached to a flat surface of the base. The base is framed by walls along the edges. This frame and the base define a space for receiving the light guiding plate 110 and the reflective sheet 130, and is configured to fit with the first chassis 300.

The reflective sheet 130, the first and second lamps 112 and 114 and the light guiding plate 110 are sequentially positioned inside the second chassis 160 such that the supporting structures 162, 164, 166 extend through the cutouts 132, 134, 136 and contact the light guiding plate 110, as shown in FIG. 3. The supporting structures 164 separate the light guiding plate 110 from the reflective sheet 130 by a predetermined distance. Preferably, the height of the supporting structures 164 is greater than the thickness of the reflective sheet 130. The supporting structures 164, which may be made of metal, are preferably formed as separate members on the base of the second chassis 160 by using a pressing apparatus where the second chassis is made of metal. However, the supporting structures 164 may be formed in any other way using other materials deemed suitable by one of ordinary skill in the art (e.g., plastic).

The display assembly 200 includes a liquid crystal (LC) panel 210, a gate printed circuit board (PCB) 220, a data PCB 230, a gate tape carrier package (TCP) 240, and a data TCP 250. The display assembly 200 is disposed on the backlight assembly 100 and displays an image by using the light from the backlight assembly 100.

The LC panel 210 includes a color filter substrate 212, an array substrate 214 having a plurality of thin film transistors (TFT), liquid crystal (not shown) interposed between the color filter substrate 212 and an array substrate 214, a first polarizing plate 216 disposed over the color filter substrate 212, and a second polarizing plate 218 disposed under the array substrate 214.

Color pixels such as red, green and blue pixels are formed on the color filter substrate 212 through a thin layer formation process like a deposition process. The color pixels filter out certain wavelengths and transmit light of certain colors. A common electrode like an indium tin oxide (ITO) layer is coated on a front surface of the color filter substrate 212.

The array substrate 214 may be formed of a transparent glass, and the TFTs are arranged in a matrix thereon. A source terminal of each TFT is connected to a data line, and a gate terminal of each TFT is connected to a gate line. A pixel electrode is formed on a drain terminal of each TFT, for example as an indium tin oxide (ITO) layer. When an electrical signal is supplied to the data and gate lines, the electrical signal is transferred to the source and gate terminals. Thus, the TFT is turned on or off according to the electrical signal. An image signal is transferred to the drain terminal when the TFT is turned on.

When the TFT is turned on, an electric field is induced between the pixel electrode and the common electrode, causing the alignment angle of the LC to change. As light transmissivity changes in accordance with the variation of the LC alignment angle, displayed images can be controlled through the electric field.

The gate TCP 240 is secured to a gate portion of the LC panel 210 for applying a gate driving signal, and the source TCP 250 is also secured to a source portion of the LC panel 210 for applying a data driving signal. The gate PCB 220 is connected to the gate TCP 240, and applies the gate driving signal to the gate line. The data PCB 230 is connected to the data TCP 240 and applies the data driving signal, which is an image signal supplied out of the LC panel, to the data line. The electrical connections for driving an LC panel are well known.

Although the above exemplary LCD device has the data and gate PCBs 220 and 230, respectively, an integrated PCB or any other configuration known to one of ordinary skill in the art may also be utilized in place of the respective data and gate PCBs 220 and 230. The integrated PCB includes the gate PCB 220 and the data PCB 230 in one board.

The first chassis 300 is combined with the second chassis 160, so that the backlight assembly 100 and the display assembly 200 are held between the first and second chassis 300 and 160. Although not shown, the LCD device further includes a rear enclosure disposed under the second chassis 160 and a front enclosure disposed on the first chassis 300.

Although the above embodiment discloses cutouts 134 as being holes formed near the corners of the reflective sheet 130, "cutouts" are not so limited. For example, cutouts do not have to be holes—the corner sections of the reflective sheet 130 may also be removed entirely to accommodate the supporting structures 162, 164, 166. "Cutouts" encompass any way of removing or reshaping a section of the reflective sheet 130 to allow the supporting structures 164 to support the light guiding plate 110.

According to the embodiment of the invention described above, the first, second, third and fourth supporting structures 162, 164, 166 space the reflective sheet 130 apart from the light guiding plate 110, thereby preventing the reflective sheet from expanding and forming an uneven surface. The supporting structures 162, 164, 166 directly support the light guiding plate 110 by extending through the cutouts in the reflective sheet 130 and preventing the light guiding plate 110 from pressing the reflective sheet 130. Because the light guiding plate 110 does not press down on the reflective sheet 130, the light guiding plate 110 does not contribute to the reflective sheet's loosening, sliding, wrinkling and otherwise moving in ways that adversely affect the display quality.

Although the above exemplary embodiment discusses the flat-type light guiding plate, the wedge-type light guiding plate or any other configuration known to one of the ordinary skill in the art may also be utilized in place of the flat-type light guiding plate.

As a modification to the first embodiment, the lamps of the backlight assembly 100 may be disposed along all sides of the light guiding plate 110, rather than just on two sides. This may be achieved, for example, by positioning four I-shaped or two L-shaped lamps near the rectangular light guiding plate.

Figure 4:
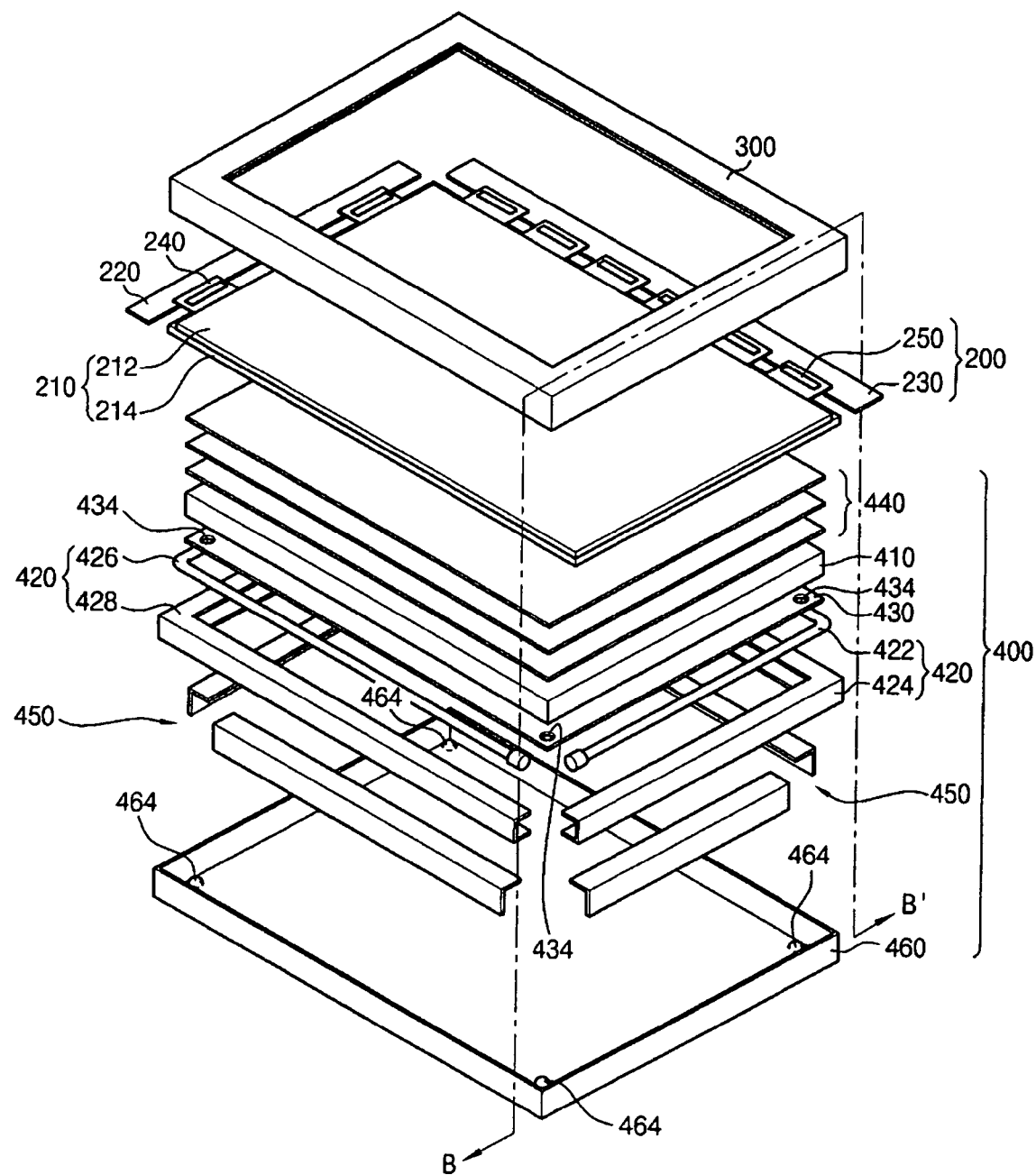
FIG. 4 is a top exploded perspective view of an LCD device according to a second embodiment of the present invention.
Figure 5:
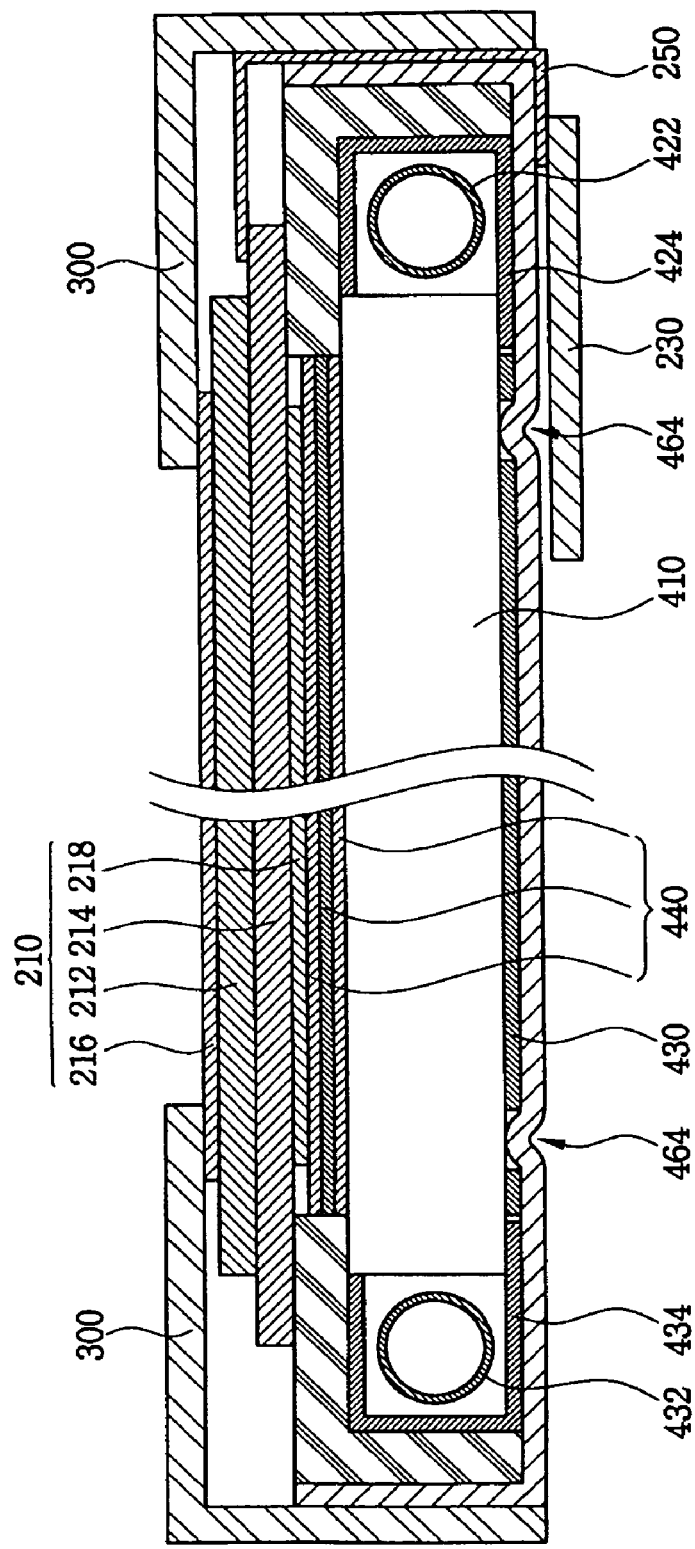
FIG. 5 is a cross sectional view taken along the line B–B' of FIG. 4.

FIGS. 4 and 5 illustrate a second embodiment of the LCD device. The second embodiment includes a backlight assembly 400, a display assembly 200 and a first chassis 300. The display assembly 200 of the second embodiment is substantially similar to the first embodiment of the present invention. Unlike the first embodiment, the second embodiment uses L-shaped lamps. Areas of a reflective sheet that are near the angular portion, or the "bend," in the L-shaped lamp are especially vulnerable to the problem caused by expansion, partly because they receive heat from multiple directions. Where L-shaped lamps are used, the corners of the reflective sheet expand more than areas near the center of the reflective sheet, and the reflective sheet loses its flatness. The invention is effective in minimizing the display quality degradation that results from the different degrees of reflective sheet expansion.

FIG. 4 is a top exploded perspective view of an LCD device according to a second embodiment of the present invention, and FIG. 5 is a cross sectional view taken along the line B–B' of FIG. 4. As will be described below, the backlight assembly of the LCD device according to the second embodiment includes an L-shaped lamp, one reflective sheet, and one light guiding plate.

The backlight assembly 400 includes a light guiding plate 410, a lamp assembly 420, a reflective sheet 430, a plurality of optical sheets 440, a mold frame 450, and a second chassis 460. The backlight assembly 400 supplies light to the display assembly 200.

As described in reference to the first embodiment above, the light guiding plate 410 redirects the light that is generated by the lamp assembly 420. Although the lamps themselves are linear light sources, they effectively act like a surface light source when combined with the light guiding plate 410. The light guiding plate 410 directs light toward the optical sheets.

The lamp assembly 420 includes a first L-shaped lamp 422, a first lamp reflector 424 for covering the first L-shaped lamp 422, a second L-shaped lamp 426, and a second lamp reflector 428 for covering the first L-shaped lamp 426. The first and second L-shaped lamps 422 and 426 are disposed along the sides of the light guiding plate 410 and irradiate the light guiding plate 410. The first and second lamp reflectors 424 and 428 are secured to the edges of the light guiding plate 410 (see FIG. 5) and prevent light from the lamps 422 and 426 from leaking. Although the Figures portray a backlight assembly including a flat-type light guiding plate, a wedge-type light guiding plate or any other configuration known to one of ordinary skill in the art may be utilized in place of the flat-type light guiding plate.

The reflective sheet 430 includes cutouts 434 formed near the corners. The reflective sheet 430 is disposed under the light guiding plate 410 so it can reflect any leaked light toward the optical sheets 440, thereby improving light uniformity.

The reflective sheet 430, the light guiding plate 410, the lamp assembly 420, and the optical sheets 440 are sequentially positioned in the second chassis 460 (see FIG. 5). The mold frame 450 is also positioned in the second chassis 460 to hold the reflective sheet 430, the light guiding plate 410, the lamp assembly 420, and the optical sheets 440 together, which are then positioned next to the second chassis 462. The mold frame 450 prevents these components from moving freely with respect to one another, and supports the display assembly 200.

The second chassis 460 for supporting the light guiding plate 440 includes a base with supporting structures 464. The base is framed by walls formed along the edges. The frame and the base define a space for receiving the light guiding plate 410 and the reflective sheet 430.

The reflective sheet 430, the lamp assembly 420 and the light guiding plate 410 are sequentially received inside the second chassis 460 such that the supporting structures 464 separate the light guiding plate 410 from the reflective sheet 430 by a predetermined distance. Preferably, the height of the supporting structures 464 is greater than the thickness of the reflective sheet 430.

Although the embodiments disclosed herein show the cutouts 434 as being holes, holes are just one exemplary embodiment of the cutouts 434 and the invention is not so limited. For example, the corner sections of the reflective sheet 430 may be removed in their entirety to accommodate the supporting structures. There may also be more than, or fewer than, four cutouts, and not all the cutouts have to have the same shape. Further, the cutouts and the protrusions do not have to be located near the corners of the reflective sheet and the second chassis, respectively.

The supporting structures 464 space the reflective sheet 430 apart from the light guiding plate 410, thereby reducing the unevenness of the surface that results from an expansion of the reflective sheet 430. The supporting structures 464 directly support the light guiding plate 410 by extending through the cutouts 434, so that the light guiding plate does not press the reflective sheet 430 and exacerbate the loosening of the reflective sheet 430.

Figure 6:
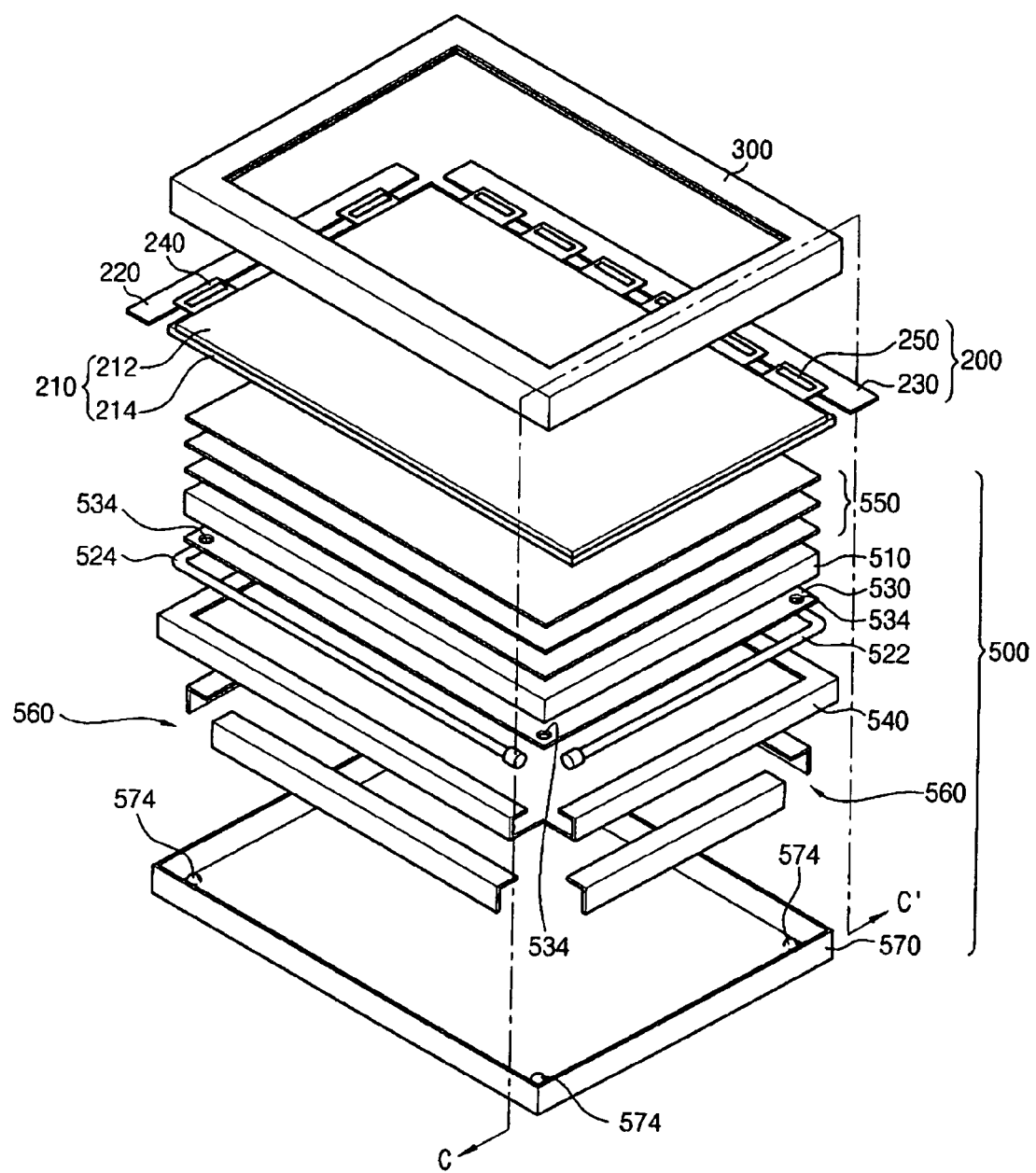
FIG. 6 is a top exploded perspective view of an LCD device according to a third embodiment of the present invention.
Figure 7:
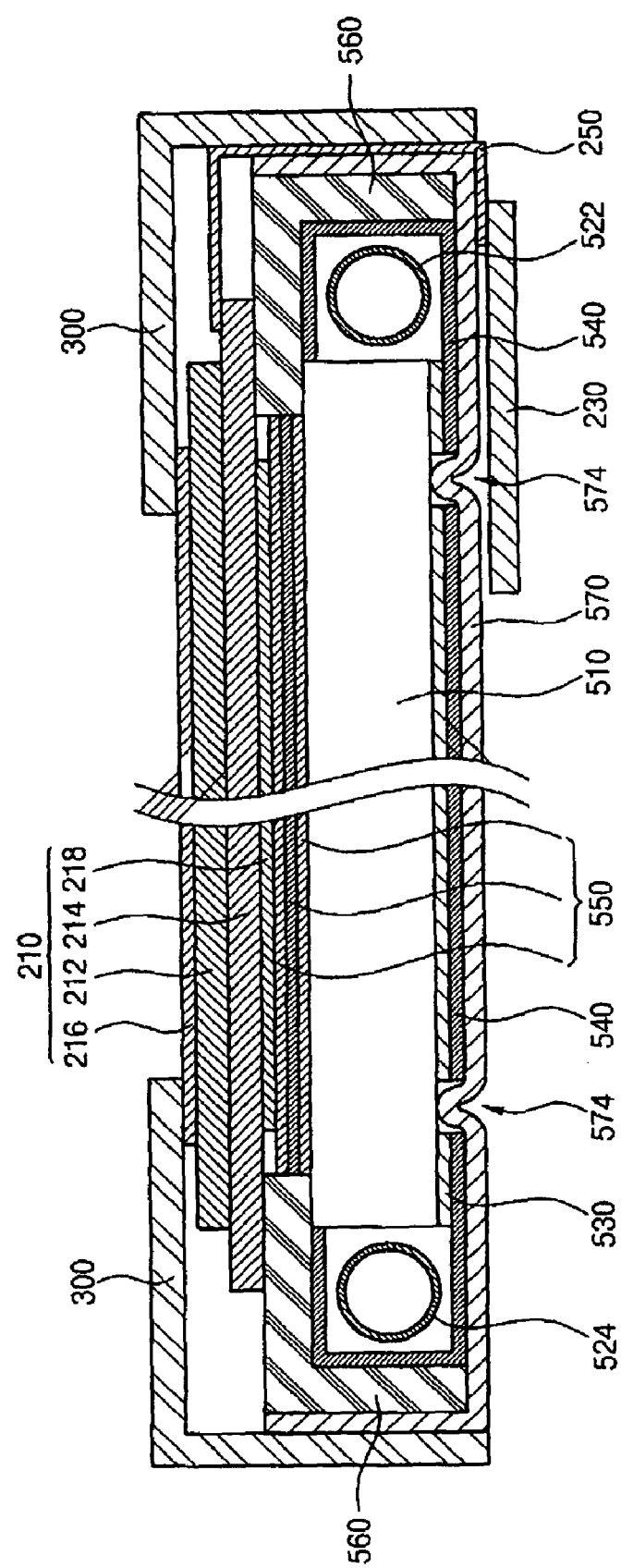
FIG. 7 is a cross sectional view taken along the line C–C' of FIG. 6.

FIG. 6 is a top exploded perspective view of an LCD device according to a third embodiment of the present invention, and FIG. 7 is a cross sectional view taken along the line C–C' of FIG. 6. The LCD device according to the third embodiment includes a backlight assembly having the L-shaped lamp and two reflective sheets.

Referring to FIGS. 6 and 7, the LCD device of the third embodiment includes a backlight assembly 500, a display assembly 200, and a first chassis 300. The display assembly 200 of the present embodiment is the same as the first embodiment of the present invention.

The backlight assembly 500 includes a light guiding plate 510, first and second L-shaped lamps 522 and 524, first and second reflective sheets 530 and 540, a plurality of optical sheets 550, a mold frame 560, and a second chassis 570, and supplies light to the display assembly 200.

The light guiding plate 510 redirects the light generated from the first and second L-shaped lamps 522 and 524. As described above, although the lamp is a linear light source by itself, it acts as a surface light source when combined with the light guiding plate 510. The lamps 522, 524 and the light guiding plate 510 irradiate the optical sheets 550.

The first and second L-shaped lamps 522 and 524 are disposed along the sides of the light guiding plate 510, supplying light to the light guiding plate 510. The second reflective sheet 540 covers the light guiding plate 510 and the first and second L-shaped lamps 522 and 524, thereby preventing the light emitted by the lamps 522 and 524 from leaking.

The first reflective sheet 530 includes a plurality of cutouts 534 formed near the corners. The first reflective sheet 530 is disposed under the light guiding plate 510 and reflects the light that leaked from the light guiding plate 510 back toward the light guiding plate 510 to improve luminance uniformity.

The second reflective sheet 540 is disposed under the first reflective sheet 530, and reflects any light that leaked from the first reflective sheet 530 back toward the first reflective sheet 530. In addition, the second reflective sheet 540 surrounds the first and second L-shaped lamps 522 and 524 and reflects any light that leaked from the first and second L-shaped lamps 522, 524 back toward the light guiding plate 510.

The optical sheets 550 improve the uniformity of the light coming from the light guiding plate 510.

The second reflective sheet 540, the first reflective sheet 530, the light guiding plate 510, the first and second L-shaped lamps 522, 524, and the optical sheets 550 are sequentially placed in the second chassis 570 (see FIG. 7). The mold frame 560 is also received in the second chassis 570 to hold the first reflective sheet 530, the light guiding plate 510, the first and second L-shaped lamps 522 and 524, and the optical sheets 550 together. The mold frame 560 is then positioned against the second chassis, thereby creating a confined space for these components and preventing the components from moving with respect to one another. The mold frame 560 supports the display assembly 200.

The second chassis 570 for supporting the light guiding plate 510 includes a base having supporting structures 574 and a frame in the shape of walls formed along the edges of the base. The frame and the base define a space for receiving the light guiding plate 510 and the first and second reflective sheets 530 and 540.

The first and second reflective sheets 530 and 540, the light guiding plate 510, the first and second L-shaped lamps 522 and 524, and the optical sheets 550 are sequentially placed inside the second chassis 570 such that the supporting structures 574 separate the light guiding plate 510 from the first and second reflective sheets 530 and 540 by a predetermined distance. The supporting structures 574 are formed to be taller than the combined thickness of the first and second reflective sheets 530 and 540. A plurality of cutouts 534 are formed on the first and second reflective sheets 530 and 540 to accommodate the supporting structures.

As in the first and the second embodiments above, the cutouts are not limited to being circular-shaped holes shown in FIG. 6. The cutouts 534 may be any removing or reshaping of a section of the reflective sheet 530 and 540 to accommodate the supporting structures 574. For example, the corner sections of the reflective sheets 530 and 540 may be removed in their entirety.

According to the third embodiment of the present invention, the supporting structures formed on the second chassis separate the first and second reflective sheets 530 and 540 from the light guiding plate 510, thus reducing the loosening of the first and second reflective sheets 530 and 540. The second reflective sheet 540 that is positioned adjacent to the bottom surface of the second chassis 570 extends to the walls of the second chassis. The first reflective sheet 530 is stacked on the second reflective sheet 540 and has approximately the same dimensions as the light guiding plate 510. The lower and upper reflective sheets have a plurality of cutouts for accommodating the supporting structures 574, so that the supporting structures 574 directly support the light guiding plate 510 by contacting the light guiding plate 510. Due to the presence of the supporting structures 574, the light guiding plate 510 does not press the first and second reflective sheets 530, 540. Thus, the supporting structures 574 prevent the first and second reflective sheets 530, 540 from loosening, wrinkling, and moving.

While the embodiments described thus far include a plurality of supporting structures formed on the base of the second chassis, the plurality of supporting structures may also be formed on a surface of the light guiding plate that is closest to the base when assembled.

Figure 8:
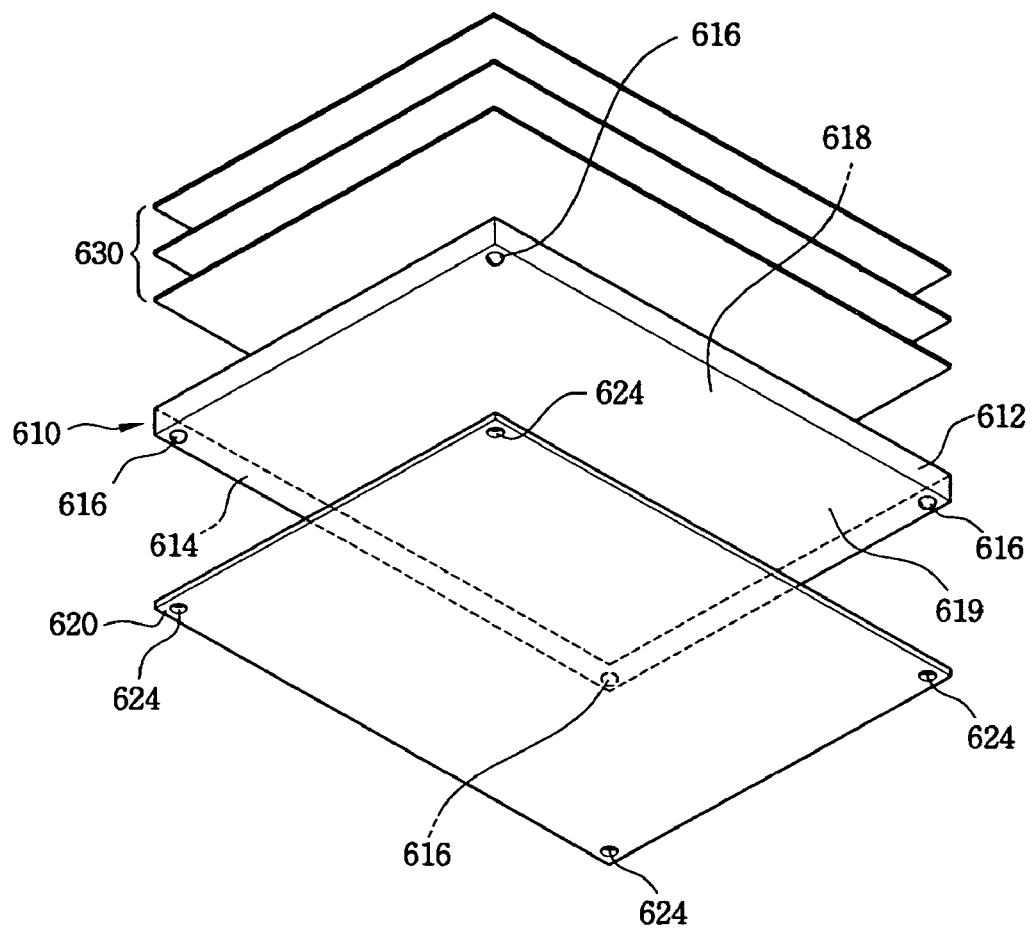
FIG. 8 is a bottom exploded perspective view of a backlight assembly according to a fourth embodiment of the present invention.

FIG. 8 is a bottom exploded perspective view illustrating a backlight assembly including a light guiding plate on which a plurality of supporting structures are formed according to a fourth embodiment of the present invention. Referring to FIG. 8, the backlight assembly includes a light guiding plate 610, a reflective sheet 620, and a plurality of optical sheets 630.

The light guiding plate 610 includes first and second edge surfaces 612 and 614 that are nearest the lamps (not shown) and a first surface 618 and a second surface 619 connected to the edge surfaces 612 and 614. Each of the first and second surfaces 618, 619 is positioned in planes that are substantially parallel to the optical sheets 630. The light generated from the lamps reaches the first and second edge surfaces 612 and 614 and exits through the second surface 619 to reach the optical sheets 630. Supporting structures 616 are formed near the corners of the first surface 618 of the light guiding plate 610, respectively.

The reflective sheet 620 includes cutouts 624 that are positioned to line up with the supporting structures 616. The reflective sheet 620 is disposed under the light guiding plate 610 closest to the first surface 618, and reflects any light that leaked from the light guiding plate 610 back toward the light guiding plate 610, thereby improving light efficiency and luminance.

The optical sheets 630 are disposed over the light guiding plate 610 on the side of the second surface 619. The optical sheets 630 improve the uniformity of the light from the light guiding plate 610, thereby enhancing the display quality of the LCD device.

According to the present invention, supporting structures formed on the second chassis or the light guiding plate separates the reflective sheet from the light guiding plate, so that the light guiding plate does not press the reflective sheet. By preventing the light guiding plate from pressing down on the reflective sheet, any undesirable loosening, wrinkling, and moving of the reflective sheet is reduced.

Having described the exemplary embodiments of the present invention and its advantages, it is noted that various changes, substitutions and alterations can be made herein without departing from the spirit and scope of the invention as defined by appended claims.

What is claimed is:

1. A backlight assembly for a display device, the assembly comprising:
    a light source;
    a light guiding plate positioned to guide light from the light source in a predetermined direction;
    a base on which the light guiding plate is mounted;
    a reflective sheet positioned between the light guiding plate and the base, the reflective sheet having a cutout therein, the reflective sheet being apart from the light guiding plate; and
    a supporting structure between the light guiding plate and the base, wherein the supporting structure extends through the cutout and supports the light guiding plate on the base.

2. The backlight assembly of claim 1, wherein the supporting structure is positioned near a corner of the base.

3. The backlight assembly of claim 1, wherein the cutout is a hole.

4. The backlight assembly of claim 1 further comprising a mold frame for holding the light source, the light guiding plate, and the reflective sheet against the base.

5. The backlight assembly of claim 1, wherein the supporting structure contacts the light guiding plate and the base.

6. The backlight assembly of claim 1, wherein the light source is a lamp, further comprising a lamp reflector for directing light toward the light guiding plate.

7. The backlight assembly of claim 6, wherein the lamp is L-shaped.

8. The backlight assembly of claim 1, wherein the light source has at least one angular portion.

9. The backlight assembly of claim 8, wherein the cutout is positioned near the angular portion of the light source.

10. The backlight assembly of claim 1, wherein the supporting structure separates the light guiding plate from the base by a predetermined distance, the predetermined distance being greater than or equal to a thickness of the reflective sheet.

11. A backlight assembly for a display device, the assembly comprising:
    a light source;
    a light guiding plate positioned to guide light from the light source in a predetermined direction;
    a base on which the light guiding plate is mounted;
    a reflective sheet positioned between the light guiding plate and the base, the reflective sheet having a cutout therein; and
    a supporting structure between the light guiding plate and the base, wherein the supporting structure extends through the cutout and supports the light guiding plate on the base, and wherein the supporting structure protrudes from a surface of the light guiding plate.

12. A backlight assembly for a display device, the assembly comprising:
    a light source;
    a light guiding plate positioned to guide light from the light source in a predetermined direction;
    a base on which the light guiding plate is mounted;
    a reflective sheet positioned between the light guiding plate and the base, the reflective sheet having a cutout therein; and
    a supporting structure between the light guiding plate and the base, wherein the supporting structure extends through the cutout and supports the light guiding plate on the base, and wherein the reflective sheet is a first reflective sheet and the cutout is a first cutout, further comprising a second reflective sheet positioned between the first reflective sheet and the base, the second reflective sheet having a second cutout through which the supporting structure extends.

13. The backlight assembly of claim 12, wherein the second reflective sheet partly encloses the light source for directing light from the light source toward the light guiding plate.

14. A liquid crystal display device comprising:
    a display assembly including a liquid crystal panel and electrical components for driving the liquid crystal panel; and
    a backlight assembly, wherein the backlight assembly includes:
        a light source;
        a light guiding plate for guiding light from the light source in a predetermined direction;
        a base on which the light guiding plate is mounted;
        a reflective sheet positioned between the light guiding plate and the base, the reflective sheet having a cutout therein; and
        a supporting structure extending through the cutout and between the light guiding plate and the base for separating the light guiding plate from the reflective sheet by a predetermined distance.

15. The device of claim 14 further comprising a chassis designed to hold the display assembly and the backlight assembly, wherein the base is a surface of the chassis.

16. A method of forming a backlight assembly for a display device, the method comprising:
    providing a light source;

positioning a light guiding plate to direct light from the light source in a predetermined direction;

mounting the light guiding plate on a base;

positioning a reflective sheet between the light guiding plate and the base, wherein the reflective sheet has a cutout therein; and extending a supporting structure through the reflective sheet for separating the reflective sheet and the light guiding plate by a predetermined distance.

17. A backlight assembly for a display device, the assembly comprising:

a light source;

a light guiding plate positioned to guide light from the light source in a predetermined direction;

a base on which the light guiding plate is mounted;

a reflective sheet positioned between the light guiding plate and the base, the reflective sheet having a cutout therein; and a supporting structure between the light guiding plate and the base, wherein the supporting structure extends through the cutout and supports the light guiding plate, the supporting structure extending from a portion of the base toward the light guiding plate.

18. The backlight assembly of claim 17, wherein the supporting structure is integrally formed with the base.

19. The backlight assembly of claim 17, wherein the base is part of a chassis for holding the light source, the light guiding plate, and the reflective sheet.

20. The backlight assembly of claim 17, wherein the supporting structure is positioned near a corner of the base.

21. The backlight assembly of claim 17, wherein the light source is a lamp, further comprising a lamp reflector for directing light toward the light guiding plate.

22. The backlight assembly of claim 17, wherein the light source has at least one angular portion, and the cutout is positioned near the angular portion of the light source.

23. The backlight assembly of claim 17, wherein the supporting structure separates the light guiding plate from the base by a predetermined distance, the predetermined distance being greater than or equal to a thickness of the reflective sheet.

* * * * *